United States Patent [19]

Deschino

[11] Patent Number: 5,294,006
[45] Date of Patent: Mar. 15, 1994

[54] BICYCLE RACK APPARATUS

[76] Inventor: Robert M. Deschino, 1656 E. Hermosa Dr., Highlands Ranch, Colo. 80126

[21] Appl. No.: 959,646

[22] Filed: Oct. 13, 1992

[51] Int. Cl.$^5$ ............................................. A47F 7/00
[52] U.S. Cl. .......................................... 211/18; 211/5
[58] Field of Search ................. 211/18, 5, 17, 19, 22

[56] References Cited

U.S. PATENT DOCUMENTS

| | | | |
|---|---|---|---|
| 569,289 | 10/1896 | Lynch | 211/18 X |
| 4,821,890 | 4/1989 | Hills | 211/18 |
| 4,997,116 | 3/1991 | Grim | 211/18 X |
| 5,078,276 | 1/1992 | Rogge et al. | 211/18 |

Primary Examiner—Alvin C. Chin-Shue
Assistant Examiner—Sarah A. Lechok

[57] ABSTRACT

An elongate track member includes a spring biased slide block, with the slide block arranged for inter-engaging and locking relative to the track structure. The slide block includes a U-shaped clamp bar having spaced legs, with each leg including a clamp jaw to secure a bicycle frame therewithin. The spring structure within the track member permits ease of lowering and raising of the organization.

7 Claims, 4 Drawing Sheets

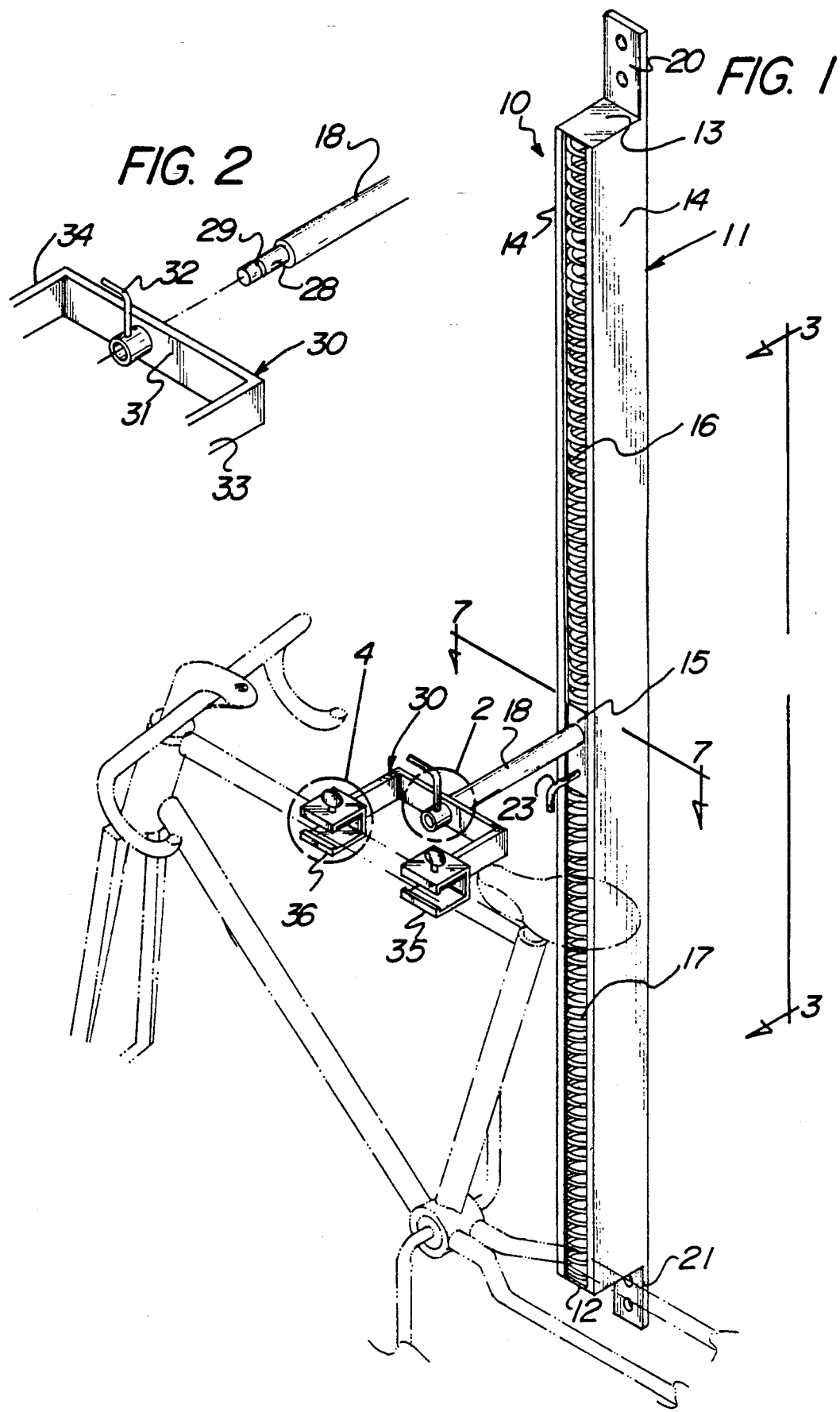

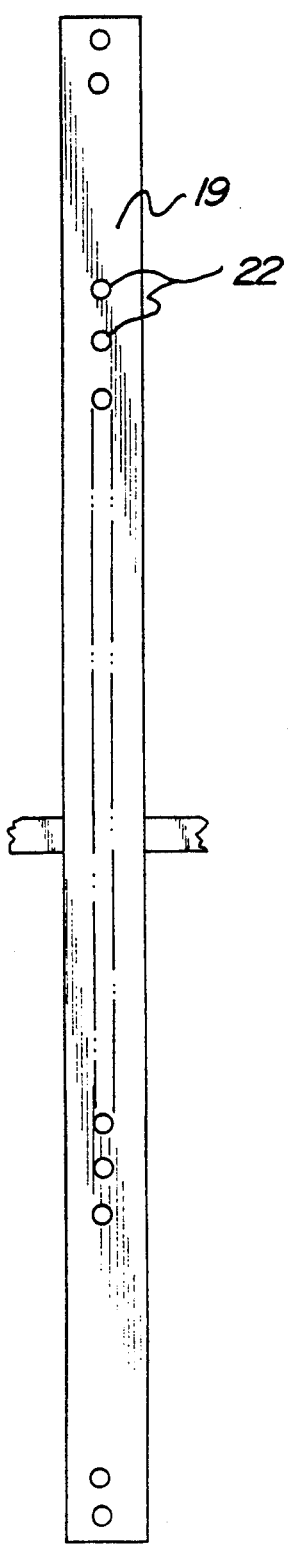
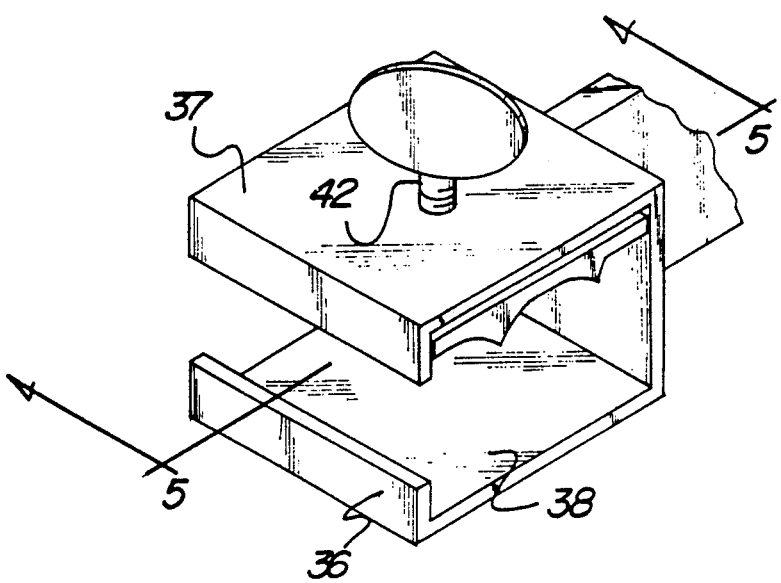
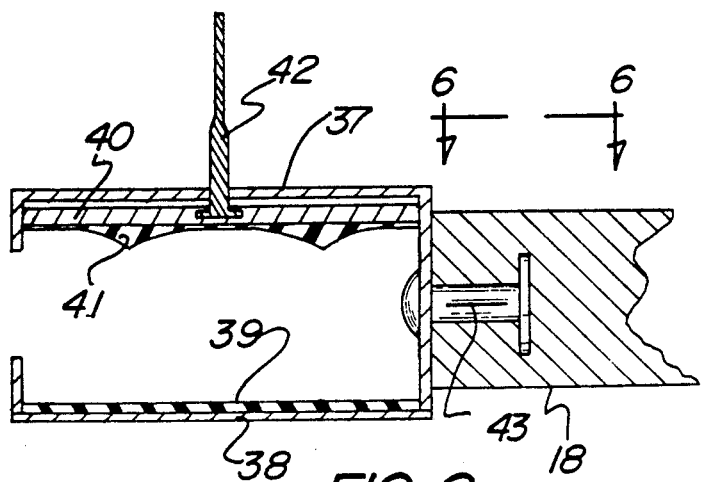
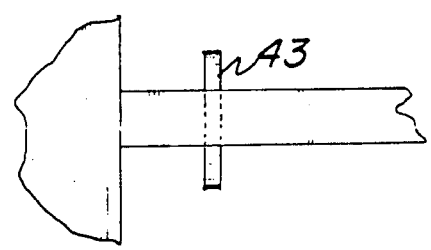

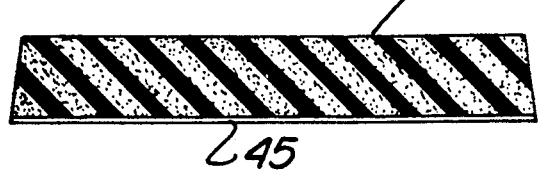
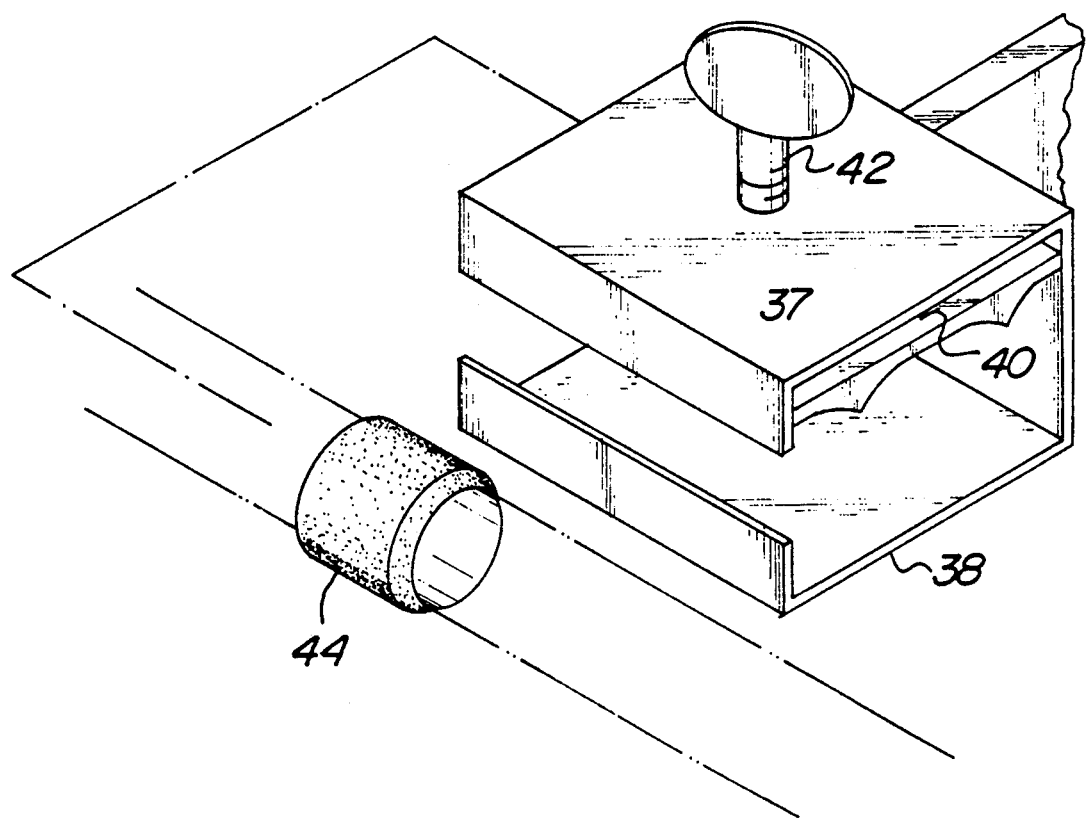

BICYCLE RACK APPARATUS

BACKGROUND OF THE INVENTION

1. Field of the Invention

The field of invention relates to storage apparatus, and more particularly pertains to a new and improved bicycle rack apparatus wherein the same is arranged for the vertical repositioning of a bicycle structure mounted within the organization for ease of storage thereof.

2. Description of the Prior Art

Rack structure of various types for mounting bicycles in various orientations has been available in the prior art. Typically, such structure is in the form of hooks and hangers such as exemplified in U.S. Pat. No. 3,829,936 to Hoenig. A bicycle wall rack having rotatable arm members for storage of a bicycle is indicated in U.S. Pat. No. 3,976,200 to Munns.

U.S. Pat. No. 4,700,845 to Fretter sets forth a bicycle storage system wherein various hangers are mounted relative to a shelf structure that in turn is fixedly secured to a garage wall.

Accordingly, it may be appreciated there continues to be a need for a new and improved bicycle rack apparatus as set forth by the instant invention which addresses both the problems of ease of use as well as effectiveness in construction for the compact mounting and manipulation of a bicycle and in this respect, the present invention substantially fulfills this need.

SUMMARY OF THE INVENTION

In view of the foregoing disadvantages inherent in the known types of bicycle rack apparatus now present in the prior art, the present invention provides a bicycle rack apparatus wherein the same utilizes a vertically reciprocatable slide bar spring biased within a track structure to permit ease of manipulation of a bicycle member. As such, the general purpose of the present invention, which will be described subsequently in greater detail, is to provide a new and improved bicycle rack apparatus which has all the advantages of the prior art bicycle rack apparatus and none of the disadvantages.

To attain this, the present invention provides an elongate track member including a spring biased slide block, with the slide block arranged for inter-engaging and locking relative to the track structure. The slide block includes a U-shaped clamp bar having spaced legs, with each leg including a clamp jaw to secure a bicycle frame therewithin. The spring structure within the track member permits ease of lowering and raising of the organization.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved bicycle rack apparatus which has all the advantages of the prior art bicycle rack apparatus and none of the disadvantages.

It is another object of the present invention to provide a new and improved bicycle rack apparatus which may be easily and efficiently manufactured and marketed.

It is a further object of the present invention to provide a new and improved bicycle rack apparatus which is of a durable and reliable construction.

An even further object of the present invention is to provide a new and improved bicycle rack apparatus which is susceptible of a low cost of manufacture with regard to both materials and labor, and which accordingly is then susceptible of low prices of sale to the consuming public, thereby making such bicycle rack apparatus economically available to the buying public.

Still yet another object of the present invention is to provide a new and improved bicycle rack apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularly in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an isometric illustration in an exploded view of section 2, as set forth in FIG. 1.

FIG. 3 is an orthographic view, taken along the lines 3—3 of FIG. 1 in the direction indicated by the arrows.

FIG. 4 is an isometric illustration of section 4 as set forth in FIG. 1.

FIG. 5 is an orthographic view, taken along the lines 5—5 of FIG. 4 in the direction indicated by the arrows.

FIG. 6 is an orthographic view, taken along the lines 6—6 of FIG. 5 in the direction indicated by the arrows.

FIG. 9 is an orthographic view, taken along the lines 9—9 of FIG. 8 in the direction indicated by the arrows.

FIG. 10 is an isometric illustration of the collar member in use relative to an associated clamp jaw.

DESCRIPTION OF THE PREFERRED EMBODIMENT

Figure 7:
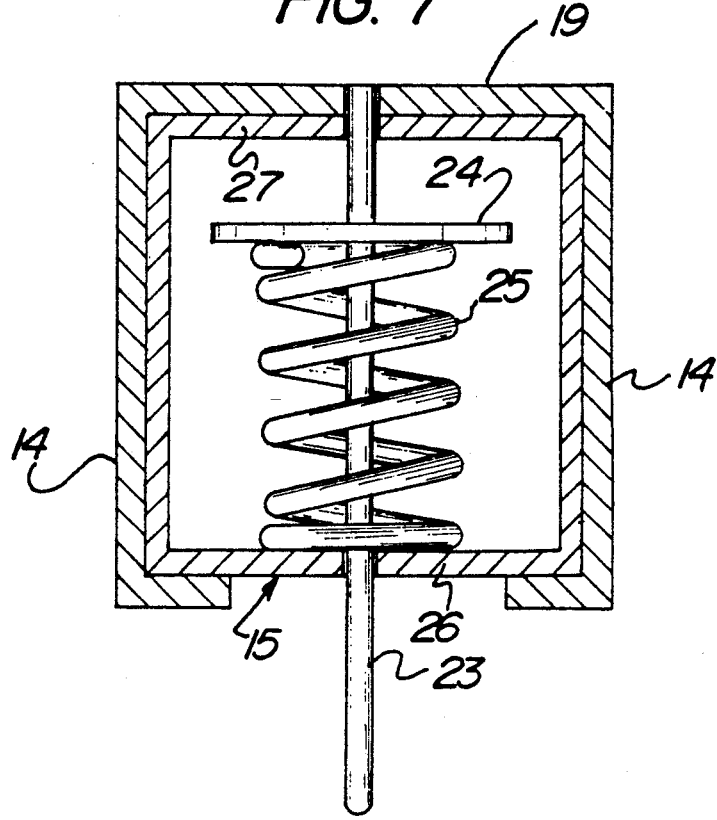
FIG. 7 is an orthographic view, taken along the lines 7—7 of FIG. 1 in the direction indicated by the arrows.
Figure 8:
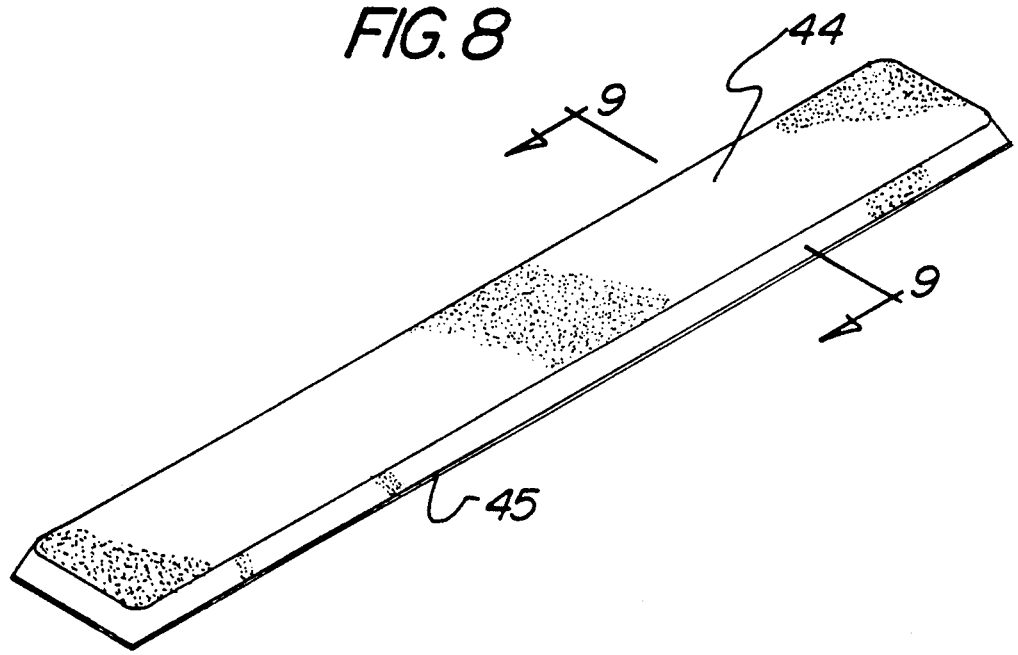
FIG. 8 is an isometric illustration of a collar member for use with the organization.

With reference now to the drawings, and in particular to FIGS. 1 to 10 thereof, a new and improved bicycle rack apparatus embodying the principles and concepts of the present invention and generally designated by the reference numeral 10 will be described.

More specifically, the bicycle rack apparatus 10 of the instant invention essentially comprises an elongate track member 11 having a floor plate 12 spaced from a roof plate 13 at opposed ends of the track member. Side walls 14 extend in a parallel relationship coextensively along the track member 11 to secure a slide block 15 within the track member. A first spring member 16 is mounted within the slide block and the roof plate 13, with a second spring member 17 mounted between the slide block and the floor plate 12. Further, the second spring member 17 is of a greater compression strength than the first spring member 16 to permit ease of lifting of an associated bicycle illustrated in phantom in FIG. 1 when secured to the apparatus 10.

The slide block 15 includes a mounting rod 18 fixedly mounted to the slide block extending orthogonally relative to the track member rear wall 19. Respective first and second mounting flanges 20 and 21 are mounted at opposed ends of the track member 11 in a coplanar relationship, as illustrated, relative to the rear wall 19 to permit ease of securement of the track member 11 relative to a vertical support surface. A row of apertures 22 extends along the roof plate 13 medially of the side walls 14 to receive a latch rod 23 reciprocatably mounted through respective slide block front and rear walls 26 and 27 (see FIG. 7). A latch rod abutment plate 24 is mounted within the slide block, with a latch rod spring 25 interposed between the abutment plate 24 and the slide block's front wall 26 to normally bias the latch rod 23 into engagement with one of the apertures 22 through the slide block's rear wall 27, as indicated in FIG. 7.

The mounting rod 18 includes a mounting rod shank 28 longitudinally extending from and coaxially aligned with the mounting rod 18, with the shank 28 having a shank groove 29 to receive a lock rod 32 mounted to a central flange 31 of an associated U-shaped clamp bar 30. The U-shaped clamp bar 30 includes parallel first and second legs 33 and 34 projecting orthogonally relative to the central flange 31. The first and second legs 33 and 34 include respective first and second U-shaped jaws 35 and 36. Each of the U-shaped jaws 35 and 36 includes a top plate 37 parallel to a bottom plate 38, with a first resilient liner 39 mounted within each clamp jaw on the bottom plate 38. A clamping plate 40 is mounted between the top and bottom plates 37 and 38 mounted to an externally threaded clamping rod 42 directed through the top plate 37, with a second resilient liner 41 mounted to the clamping plate 40 in confronting relationship relative to the first resilient liner 39 to secure the framework of the bicycle, in a manner as indicated in FIG. 1, between the clamping plate 40 and the bottom plate 38. It should be further noted that the first and second legs 33 and 34 include swivel connections 43 relative to each associated clamping jaws 35 and 36 to permit rotation of the clamping jaws to accommodate various non-linear configurations of the associated bicycle framework as required.

If required, a flexible foam collar 44 is additionally provided, having a flexible base web 45 to permit ease of surrounding engagement relative to an associated bicycle frame and positioned between the clamp jaw's bottom plate 38 and the clamping plate 40, in a manner as indicated in FIG. 10. In this manner, protection is further afforded to the bicycle framework. The collar web 45 may be formed of an adhesive or magnetic material to permit relative permanent securement to the associated bicycle framework in a peripherally spaced relationship such that the bicycle framework when positioned within the first and second clamp jaws 35 and 36 is appropriately protected relative to clamping pressures of the first and second clamp jaws.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bicycle rack apparatus, comprising,
   an elongate track member, the track member having a floor plate mounted at one end of the track member, and a roof plate mounted at a further end of the track member, with spaced side walls arranged in a parallel coextensive relationship relative to one another extending between the floor plate and the roof plate, the track member further including a rear wall between the floor plate, roof plate, and side walls, and a slide block mounted within the track member between the side walls in sliding relationship relative to the rear wall, and the slide block having a first spring member interposed between the slide block and the roof plate, and a second spring member interposed between the slide block and the floor plate, and
   mounting means secured to the slide block for mounting a bicycle member thereto, and
   lock means mounted to the slide block for selectively locking the slide block relative to the track member.

2. An apparatus as set forth in claim 1 wherein the slide block includes a slide block front wall spaced from a slide block rear wall, with the slide block rear wall arranged in sliding engagement with the track member rear wall, and the lock means includes a latch rod directed slidably through the slide block front wall and the slide block rear wall, with the track member rear wall having an elongate row of spaced apertures, with the latch rod selectively received within one of said apertures and slidably received therethrough.

3. An apparatus as set forth in claim 2 wherein the latch rod includes an abutment plate, and a latch rod spring interposed between the abutment plate and the slide block front wall to bias the latch rod into engagement with one of said apertures.

4. An apparatus as set forth in claim 3 wherein the second spring member is of a greater compression spring than said first spring member to normally bias the slide block towards the roof plate.

5. An apparatus as set forth in claim 4 wherein the mounting means includes a U-spaped clamp bar, with a mounting rod fixedly mounted to the slide block front wall, with the mounting rod having a mounting rod shank extending longitudinally beyond the mounting rod, and the mounting rod shank having a groove, and the U-shaped clamp bar having a central flange, with the central flange including a lock rod, and the lock rod received selectively within said groove to selectively and rotatably secure the central flange relative to the mounting rod shank.

6. An apparatus as set forth in claim 5 wherein the U-shaped clamp bar further includes first and second parallel legs fixedly mounted to the central flange, with the first leg and the second leg each including a respective first clamp jaw and a second clamp jaw pivotally mounted to the respective first leg and second leg, with each clamp jaw of said first clamp jaw and said second clamp jaw having a top plate spaced from and parallel a bottom plate, with the bottom plate having a resilient liner and the top plate having a clamping plate interposed between the resilient liner and the top plate, and the clamping plate having a second resilient liner in confronting relationship relative to the first resilient liner, and the clamping plate including an externally threaded rod threadedly directed through the top plate rotatably mounted relative to the clamping plate to effect reciprocation of the clamping plate relative to the bottom plate.

7. An apparatus as set forth in claim 6 including at least one flexible frame collar arranged for mounting about a frame portion of said bicycle, wherein the collar includes a collar web having adhesive thereon for adhesive securement to said bicycle frame, with the from collar mounted interposed between the clamping plate and the first resilient liner when the bicycle frame is positioned within the first clamp jaw and the second clamp jaw.

* * * * *